United States Patent [19]

Brooks et al.

[11] 4,104,184

[45] Aug. 1, 1978

[54] ELECTRICAL DEVICES CONTAINING SELECT VINYLSILOXANE DIELECTRIC FLUIDS

[75] Inventors: William T. Brooks; Gary A. Vincent, both of Midland, Mich.

[73] Assignee: Dow Corning Corporation, Midland, Mich.

[21] Appl. No.: 794,878

[22] Filed: May 9, 1977

[51] Int. Cl.² .......................... H01B 3/46; H01B 3/24; H01B 3/20
[52] U.S. Cl. .................................... 252/63.7; 336/94; 361/315
[58] Field of Search ................. 252/63.7; 174/17 LF, 174/110 S; 336/94; 361/315, 327; 260/448.2 Q

[56] References Cited

U.S. PATENT DOCUMENTS

| | | | |
|---|---|---|---|
| 1,931,455 | 10/1933 | Clark | 174/17 LF X |
| 2,449,940 | 9/1948 | Hyde | 252/63.7 X |
| 2,716,638 | 8/1955 | Cohen et al. | 260/46.2 UA |
| 2,884,432 | 4/1959 | Gordon | 252/63.7 X |
| 3,110,720 | 11/1963 | Pike | 260/448.2 Q |
| 3,438,936 | 4/1969 | Lamoreaux | 252/63.7 X |

FOREIGN PATENT DOCUMENTS 573,335  3/1959  Canada.

*Primary Examiner*—Harris A. Pitlick
*Attorney, Agent, or Firm*—Jack E. Moermond

[57] ABSTRACT

Electrical devices such as transformers and capacitors containing divinyltetramethyldisiloxane or methylvinylcyclosiloxanes as dielectric fluids are disclosed.

3 Claims, No Drawings

ELECTRICAL DEVICES CONTAINING SELECT VINYLSILOXANE DIELECTRIC FLUIDS

In numerous electrical devices it is necessary to provide a liquid insulating medium which is called a "dielectric fluid." This liquid has a substantially higher breakdown strength than air and by displacing air from spaces between conductors in the electrical equipment or apparatus, materially raises the breakdown voltage of the electrical device. With the ever increasing sophistication of electrical equipment, the various electrical devices are operating at higher and higher voltages. This means that the dielectric fluids used in such devices are subjected to greater and greater stresses. These problems have, of course, necessitated the search for improved dielectric fluids.

Polychlorinated biphenyl compounds (generally known as "PCB's") have been a standard dielectric fluid in electrical devices since the 1930's when the PCB's replaced mineral oil in certain applications. Various other liquids including some siloxanes have also been suggested for use as dielectric fluids. See for example U.S. Pat. Nos. 2,377,689 and 3,838,056 and British Pat. Nos. 899,658 and 899,661. Also, siloxane fluids containing additives have been suggested heretofore. See for example U.S. Pat. Nos. 3,948,789 and 3,984,338. Recently the PCB's have lost favor in the sight of environmentalists and, be they right or wrong, efforts are being made worldwide to find suitable replacements for the PCB's.

By way of illustration corona or partial discharge is a major factor causing deterioration and failure of capacitors or other power factor correction devices. A capacitor operating in corona will have a life of only minutes or hours instead of the expected 20 years. A capacitor properly impregnated with a suitable dielectric fluid will be essentially free of corona discharge to a voltage of at least twice the rated voltage. During use when a dielectric fluid is placed under increasing stress a point is reached where partial breakdown or corona occurs. The voltage at which the capacitor will suddenly flash into corona is known in the art as the corona inception voltage (CIV). This voltage is dependent upon the rate at which the voltage is applied. There is considerable difference between the sensitivity of different fluids to the rate of rise of voltage. The corona will, however, extinguish with a reduction of voltage. The corona extinction voltage (CEV) is not a fixed value for each fluid but is a function of the intensity of corona before the voltage is reduced. For best results both the CIV and CEV should be as high and as close together as possible.

It was suggested in U.S. Pat. No. 2,716,638 that homopolymers or copolymers or divinyltetramethylsiloxane are useful as dielectric materials in capacitors and other electrical devices. However, nowhere does this patent suggest that divinyltetramethyldisiloxane monomer per se (or methylvinylcyclosiloxanes) are useful as dielectric fluids.

In accordance with this invention it has been discovered that divinyltetramethyldisiloxane and methylvinylcyclosiloxanes can be advantageously employed as dielectric fluids in electrical devices.

More specifically, this invention relates to an electrical device containing a dielectric fluid wherein the improvement comprises employing as the dielectric fluid a siloxane selected from the group consisting of divinyltetramethyldisiloxane and methylvinylcyclosiloxanes.

The aforementioned fluid siloxanes are well known chemical compounds whose preparations are described in various places in the literature.

The methylvinylcyclosiloxanes are generally mixtures of polymers ranging in degree of polymerization from 3 (trimer) to 8 (octomer) with 4, the cyclic tetramer, predominating the mixture. Generally speaking the trimer, tetramer and pentamer species constitute the bulk of the mixture with a mixture having an average degree of polymerization of 4 being the preferred material to use at this time.

The dielectric fluid compositions of this invention may also contain small amounts of conventional additives such as acid scavengers, corrosion inhibitors and other conventional additives normally employed as such compositions so long as they do not have an adverse effect of the performance of the compositions of this invention.

The two most important electrical devices in which the dielectric fluids of this invention are useful are in capacitors and transformers. They are also very useful dielectric fluids in other electrical devices such as electrical cables, rectifiers, electromagnets, switches, fuses, circuit breakers and as coolants and insulators for dielectric devices such as transmitters, receivers, fly-back coils, sonar bouys, toys and military "black boxes." The methods for employing the dielectric fluids in these various applications (be they, for example, as a reservoir of liquid or as an impregnant) are well known to those skilled in the art.

Now in order that those skilled in the art may better understand how the present invention can be practiced the following examples are given by way of illustration and not by way of limitation. All parts and percents referred to herein are by weight and all viscosities measured at 25° C. unless otherwise specified.

EXAMPLE 1

A fluid siloxane of the formula $CH_2=CH(CH_3)_2-SiOSi(CH_3)_2CH=CH_2$ was prepared and found to have the following dielectric properties.

| Frequency (Hz) | Dielectric Constant | Dissipation Factor | Volume Resistivity (ohm-cm) |
| --- | --- | --- | --- |
| 100 | 2.32 | 0.00017 | $5 \times 10^{13}$ |
| 100,000 | 2.32 | 0.00002 | $5 \times 10^{13}$ |

Two types of test capacitors were prepared for evaluation of the above fluid siloxane using the known procedure set forth in detail in Example 2 of U.S. Pat. No. 3,948,789. One type (designated "FF" in the table below) was wound using two layers of 0.0005 inch thick polypropylene film between the aluminum electrodes. The other type (designated "FPF" in the table below) was wound using two layers of the 0.0005 inch thick polypropylene film with one layer of 0.0004 inch thick kraft paper sandwiched between the polypropylene films between the aluminum electrodes. Voltage was applied to these capacitors using a Variac control attached to the primary of a high voltage transformer. For purposes of comparison such capacitors were also impregnated with a commercial PCB dielectric fluid (Aroclor 1016). The test results are set forth in the table below.

| Dielectric Fluid | Capacitor Type | CIV (volts) | CEV (volts) |
| --- | --- | --- | --- |
| Commercial PCB | FF | 2400 | 1900 |
| Commercial PCB | FPF | 2400 | 1900 |
| Above fluid siloxane | FF | 3800 | 2200 |
| Above fluid siloxane | FPF | 3900 | 2300 |

EXAMPLE 2

A fluid methylvinylcyclosiloxane of the average formula $[(CH_3)(CH_2=CH)SiO]_{4.5}$ was prepared and found to have the following dielectric properties.

| Frequency (Hz) | Dielectric Constant | Dissipation Factor | Volume Resistivity (ohm-cm) |
| --- | --- | --- | --- |
| 100 | 2.52 | 0.00002 | $9 \times 10^{15}$ |
| 100,000 | 2.52 | 0 | $9 \times 10^{15}$ |

Test capacitors were prepared as in the previous example for evaluation of this fluid siloxane. The same commercial PCB is included for comparison. The test results are set forth in the table below.

| Dielectric Fluid | Capacitor Type | CIV (volts) | CEV (volts) |
| --- | --- | --- | --- |
| Commercial PCB | FF | 2400 | 1900 |
| Commerrcial PCB | FPF | 2400 | 1900 |
| Above fluid siloxane | FF | 3600 | 3100 |
| Above fluid siloxane | FPF | 3400 | 2800 |

That which is claimed is:

1. In an electrical device containing a dielectric fluid, the improvement comprising employing as the dielectric fluid $CH_2=CH(CH_3)_2SiOSi(CH_3)_2CH=CH_2$.

2. A device as defined in claim 1 which is a transformer.

3. A device as defined in claim 1 which is a capacitor.

* * * * *

UNITED STATES PATENT AND TRADEMARK OFFICE
CERTIFICATE OF CORRECTION

PATENT NO. : 4,104,184
DATED : August 1, 1978
INVENTOR(S) : WILLIAM T. BROOKS and GARY A. VINCENT It is certified that error appears in the above-identified patent and that said Letters Patent are hereby corrected as shown below:

Column 1, line 55, "or" second occurrence should read -- of --.

Column 2, lines 42 and 43, the formula should read $$--CH_2=CH(CH_3)_2SiOSi(CH_3)_2CH=CH_2--.$$

Signed and Sealed this

Thirteenth Day of March 1979

[SEAL]

Attest:

RUTH C. MASON
Attesting Officer

DONALD W. BANNER
Commissioner of Patents and Trademarks